US012757208B2

(12) United States Patent
Yoshioka et al.

(10) Patent No.: US 12,757,208 B2
(45) Date of Patent: Oct. 6, 2026

(54) TERMINAL AND RADIO COMMUNICATION METHOD

(71) Applicant: NTT DOCOMO, INC., Tokyo (JP)

(72) Inventors: Shohei Yoshioka, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 370 days.

(21) Appl. No.: 18/559,715

(22) PCT Filed: May 10, 2021

(86) PCT No.: PCT/JP2021/017773
§ 371 (c)(1),
(2) Date: Nov. 8, 2023

(87) PCT Pub. No.: WO2022/239085
PCT Pub. Date: Nov. 17, 2022

(65) Prior Publication Data

US 2024/0381360 A1 Nov. 14, 2024

(51) Int. Cl.

| | |
|---|---|
| ***H04W 72/23*** | (2023.01) |
| ***H04L 1/08*** | (2006.01) |
| ***H04L 27/26*** | (2006.01) |
| ***H04W 72/1273*** | (2023.01) |
| ***H04W 72/21*** | (2023.01) |

(52) U.S. Cl.
CPC ............... *H04W 72/21* (2023.01); *H04L 1/08* (2013.01); *H04L 27/2605* (2013.01); *H04W 72/1273* (2013.01)

(58) Field of Classification Search
CPC . H04W 72/02; H04W 72/04; H04W 72/0446; H04W 72/21; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

2020/0403835 A1* 12/2020 Matsumura ............ H04B 1/713
2021/0297193 A1* 9/2021 Noh ...................... H04L 1/1861

FOREIGN PATENT DOCUMENTS

JP 2020523826 A 8/2020

OTHER PUBLICATIONS

Office Action issued in Japanese Application No. 2023-520604, mailed Apr. 8, 2025 (6 pages).
Office Action issued in Japanese Patent Application No. 2023-520604, dated Aug. 19, 2025 (6 pages).
3GPP TSG RAN Meeting #86; RP-193248 "New Work Item on NR support of Multicast and Broadcast Services" Huawei; Sitges, Spain; Dec. 9-12, 2019 (6 pages).
(Continued)

*Primary Examiner* — Bo Hui A Zhu
(74) *Attorney, Agent, or Firm* — Osha Bergman Watanabe & Burton LLP

(57) ABSTRACT

A terminal transmits the feedback of the automatic retransmission request. When the bit string of the feedback is associated with the resource of the uplink control channel and only the negative response is fed back, the terminal applies only the index of one cyclic shift to one resource.

6 Claims, 14 Drawing Sheets

(56) References Cited

OTHER PUBLICATIONS

3GPP TSG RAN WG1 #104b-e; R1-2102901 "Discussion on reliability improvement" CMCC; e-Meeting; Apr. 12-20, 2021 (9 pages).
3GPP TSG RAN WG1 #104bis-e; R1-2103051 "Mechanisms to Improve Reliability of NR MBS for RRC_CONNECTED UEs" Intel Corporation; e-Meeting; Apr. 12-20, 2021 (7 pages).
3GPP TSG-RAN WG1 Meeting #104bis-e; R1-2103739 "Discussion on reliability mechanisms for NR MBS" Ericsson; e-Meeting; Apr. 12-20, 2021 (15 pages).
International Search Report issued in International Application No. PCT/JP2021/017773, mailed Dec. 21, 2021 (5 pages).
Written Opinion issued in International Application No. PCT/JP2021/017773; Dated Dec. 21, 2021 (4 pages).

* cited by examiner

| HARQ-ACK bits | PUCCH resource |
|---|---|
| 000 | 0 |
| 001 | 1 |
| 010 | 2 |
| 011 | 3 |
| 100 | 4 |
| 101 | 5 |
| 110 | 6 |
| 111 | N/A |

NACK: 0
- (ACK): 1

In case of NACK, -, NACK to 3 PDSCH

FIG. 10

N = 5

PUCCH resource set

| PUCCH resource index | |
|---|---|
| 000 | Table 0 |
| 001 | Table 1 |
| 010 | **Table 2** |
| 011 | Table 3 |
| 100 | Table 4 |
| 101 | Table 5 |
| 110 | Table 6 |
| 111 | Table 7 |

Table 2

| HARQ-ACK bits | PUCCH resource |
|---|---|
| 00000 | 0 |
| 00001 | 1 |
| 00010 | 2 |
| 00011 | 3 |
| 00100 | 4 |
| ... | ... |
| 11110 | 30 |
| 11111 | N/A |

If M = 4, only 1**** are applied

FIG. 11

PUCCH resource set 0 (N0=2)

| PUCCH resource index | |
|---|---|
| 000 | Table 0 |
| 001 | Table 1 |
| 010 | Table 2 |
| 011 | Table 3 |
| 100 | Table 4 |
| 101 | Table 5 |
| 110 | Table 6 |
| 111 | Table 7 |

Table 2

| HARQ-ACK bits | PUCCH resource |
|---|---|
| 00 | 0 |
| 01 | 1 |
| 10 | 2 |
| 11 | N/A |

FIG. 12

PUCCH resource set 1 (N1=5)

| PUCCH resource index | |
|---|---|
| 000 | Table 0 |
| 001 | Table 1 |
| 010 | Table 2 |
| 011 | Table 3 |
| 100 | Table 4 |
| 101 | Table 5 |
| 110 | Table 6 |
| 111 | Table 7 |

Table 2

| HARQ-ACK bits | PUCCH resource |
|---|---|
| 00000 | 0 |
| 00001 | 1 |
| 00010 | 2 |
| 00011 | 3 |
| 00100 | 4 |
| ... | ... |
| 11110 | 30 |
| 11111 | N/A |

PUCCH resource set

| HARQ-ACK bits | PUCCH resource |
|---|---|
| 000 | 0 |
| 001 | 1 |
| 010 | 2 |
| 011 | 3 |
| 100 | 4 |
| 101 | 5 |
| 110 | 6 |
| 111 | N/A |

FIG. 16

N = 5

PUCCH resource set

| PUCCH resource index | |
|---|---|
| 000 | Table 0 |
| 001 | Table 1 |
| 010 | Table 2 |
| 011 | Table 3 |
| 100 | Table 4 |
| 101 | Table 5 |
| 110 | Table 6 |
| 111 | Table 7 |

Table 2

| HARQ-ACK bits | PUCCH resource | CS index |
|---|---|---|
| 000 00 | 0 | 0 |
| 000 01 | 0 | 4 |
| 000 10 | 0 | 8 |
| 000 11 | 1 | 0 |
| 001 00 | 1 | 4 |
| ... | ... | ... |
| 111 10 | 7 | 4 |
| 111 11 | N/A | N/A |

TERMINAL AND RADIO COMMUNICATION METHOD

TECHNICAL FIELD

The present disclosure relates to a terminal and a radio communication method corresponding to a multicast/broadcast service.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

Release 17 of the 3GPP covers simultaneous data transmission (also called broadcasting) services (tentatively called Multicast and Broadcast Services (MBS)) to specified or unspecified multiple terminals (User Equipment, UE) in NR (Non-Patent Literature 1).

For example, in MBS, scheduling and reliability improvement (For example, HARQ (Hybrid Automatic repeat request) feedback to the radio base station (gNB)) of UE groups subject to services is studied.

CITATION LIST

Non-Patent Literature

[Non-Patent Literature 1]
"New Work Item on NR support of Multicast and Broadcast Services," RP-193248, 3GPP TSG RAN Meeting #86, 3GPP, December 2019

SUMMARY OF INVENTION

The MBS HARQ also assumes the application of the NACK-only feedback method.

However, in the case of MBS, since the configuration (multiplexing) method of NACK-only feedback may be different for each UE, there is a problem that the network (gNB) cannot recognize the number of bits of feedback and blind decoding (BD) is required.

Therefore, the following disclosure is made in view of this situation, and the purpose of the disclosure is to provide a terminal and a radio communication method capable of realizing efficient NACK-only feedback in MBS.

An aspect of the present disclosure is a terminal (UE200) including a transmission unit (data transmission and reception unit 260) that transmits feedback for automatic retransmission request, and a control unit (control unit 270) that, when a bit string of the feedback is associated with resources of an uplink control channel and only a negative response is fed back, applies only an index of one cyclic shift to one of the resources.

An aspect of the present disclosure is a terminal (UE200) including a transmission unit (data transmission and reception unit 260) that transmits feedback for automatic retransmission request, and a control unit (control unit 270) that, when a bit string of the feedback is associated with resources of an uplink control channel and only a negative response is fed back, applies two-phase shift modulation to one of the resources.

An aspect of the present disclosure is a terminal (UE200) including a transmission unit (data transmission and reception unit 260) that transmits feedback for automatic retransmission request, and a control unit (control unit 270) that, when a bit string of the feedback is associated with resources of an uplink control channel and only a negative response is fed back, assumes that an index of the resource indicates correspondence between the bit string of the feedback and the resources.

An aspect of the present disclosure is a terminal (UE200) including a transmission unit (data transmission and reception unit 260) that transmits feedback for automatic retransmission request, and a control unit (control unit 270) that, when a bit string of the feedback is bundled and only a negative response is fed back, assumes that there is only one set of resources for an uplink control channel.

An aspect of the present disclosure is a terminal (UE200) including a transmission unit (data transmission and reception unit 260) that transmits feedback for automatic retransmission request, and a control unit (control unit 270) that, when multiple bits are multiplexed in feedback only for negative responses using a specific uplink control channel format, applies multiple cyclic shift indices to resources of one of the uplink control channel.

An aspect of the present disclosure is a radio communication method including the steps of transmitting feedback for automatic retransmission request, and when a bit string of the feedback is associated with resources of an uplink control channel and only a negative response is fed back, applying only an index of one cyclic shift to one of the resources.

BRIEF DESCRIPTION OF DRAWINGS

FIG. 10 is a diagram showing an example of the configuration of the PUCCH resource set and the table associated with the PUCCH resource set according to the operation example 3-1.

FIG. 11 is a diagram showing a configuration example (Part 1) of a PUCCH resource set and a table associated with the PUCCH resource set according to operation example 3-2.

FIG. 12 is a diagram showing a configuration example (Part 2) of the PUCCH resource set and the table associated with the PUCCH resource set according to the operation example 3-2.

FIG. 16 is a diagram showing an example of the configuration of the PUCCH resource set and the table associated with the PUCCH resource set according to the operation example 5-1.

MODES FOR CARRYING OUT THE INVENTION

Figure 1:
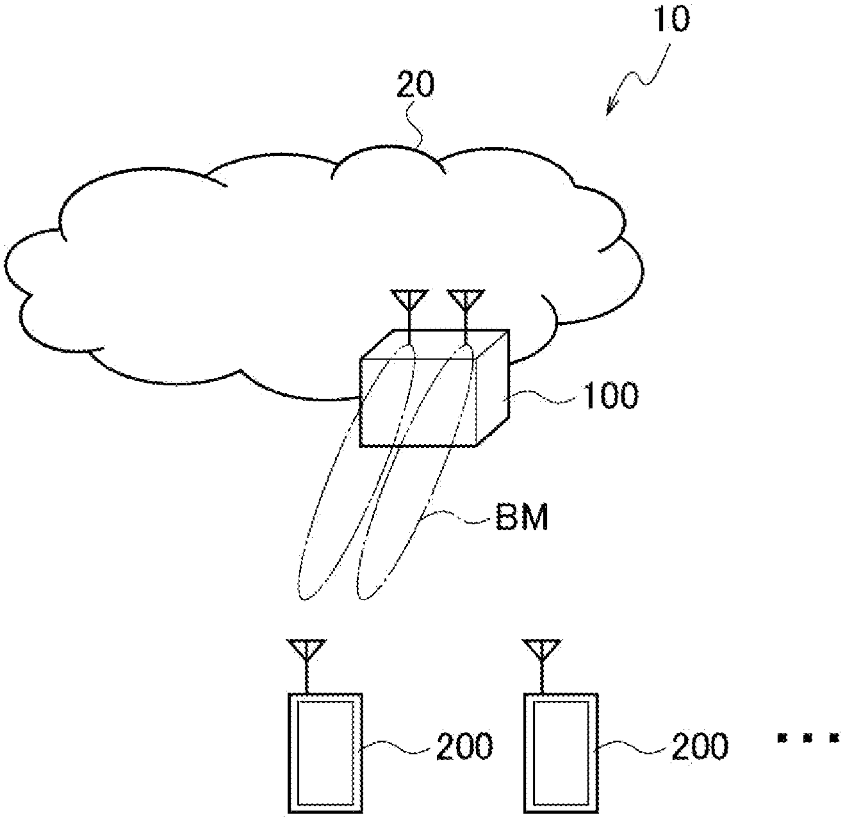
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System (1.1) Example of a System Configuration FIG. 1 is an overall schematic configuration diagram of the radio communication system 10 according to the present embodiment. The radio communication system 10 is a radio communication system according to 5G New Radio (NR) and includes the Next Generation-Radio Access Network 20 (hereinafter referred to as the NG-RAN20 and a plurality of terminals 200 (User Equipment 200, UE200).

The radio communication system 10 may be a radio communication system according to a system called Beyond 5G, 5G Evolution or 6G.

The NG-RAN20 includes a radio base station 100 (gNB100). The specific configuration of the radio communication system 10 including the number of gNBs and UEs is not limited to the example shown in FIG. 1.

The NG-RAN20 actually includes a plurality of NG-RAN Nodes, specifically gNBs (or ng-eNBs), connected to a core network (5GC, not shown) according to 5G. Note that the NG-RAN20 and 5 GCs may be simply described as "networks".

The gNB100 is a radio base station according to the NR, and performs radio communication according to the UE200 and the NR. The gNB100 and the UE200 can support Massive MIMO, which generates a more directional beam BM by controlling radio signals transmitted from a plurality of antenna elements, carrier aggregation (CA), which uses a plurality of component carriers (CCs) bundled together, and dual connectivity (DC), which simultaneously communicates between the UE and each of a plurality of NG-RAN nodes.

The radio communication system 10 supports FR1 and FR2. The frequency band of each FR (Frequency Range) is as follows.

FR1: 410 MHz~7.125 GHz

FR2: 24.25 GHz~52.6 GHZ

FR1 uses sub-carrier spacing (SCS) of 15, 30 or 60 kHz and may use a bandwidth (BW) of 5-100 MHz. FR2 is higher frequency than FR1 and may use SCS of 60 or 120 kHz (may include 240 kHz) and may use a bandwidth (BW) of 50~400 MHZ.

In addition, the radio communication system 10 may support higher frequency bands than those of FR2. Specifically, the radio communication system 10 may support frequency bands greater than 52.6 GHz and up to 114.25 GHZ. the radio communication system 10 may also support frequency bands between FR1 and FR2.

Cyclic Prefix-Orthogonal Frequency Division Multiplexing (CP-OFDM)/Discrete Fourier Transform-Spread (DFT-S-OFDM) with greater Sub-Carrier Spacing (SCS) may also be applied. Furthermore, DFT-S-OFDM may be applied not only to the uplink (UL) but also to the downlink (DL).

Figure 2:
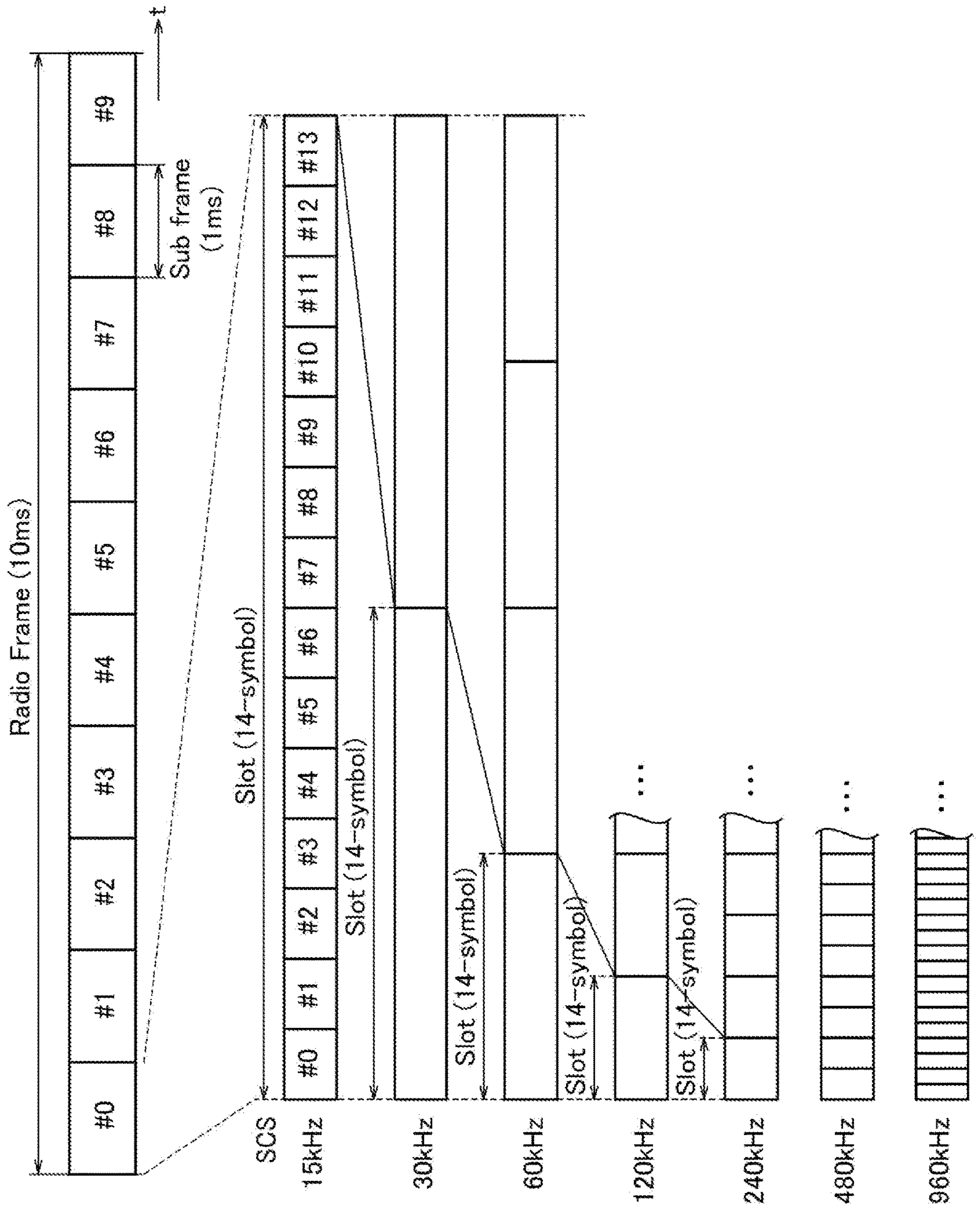
FIG. 2 is a diagram showing a configuration example of a radio frame, a sub-frame and a slot used in the radio communication system 10.

FIG. 2 shows a configuration example of a radio frame, subframe and slot used in the radio communication system 10.

As shown in FIG. 2, one slot is composed of 14 symbols, and the larger (wider) the SCS, the shorter the symbol period (and slot period). Note that the number of symbols constituting one slot may not necessarily be 14 symbols (For example, 28, 56 symbols). The number of slots per subframe may vary depending on the SCS. In addition, the SCS may be wider than 240 kHz (For example, as shown in [FIG. 2] 480 kHz, 960 kHz).

Note that the time direction (t) shown in FIG. 2 may be referred to as a time domain, symbol period, symbol time, etc. The frequency direction may be referred to as a frequency domain, resource block, resource block group, subcarrier, BWP (Bandwidth part), subchannel, common frequency resource, etc.

(1.2) Provision of Multicast and Broadcast Services (MBS).

For example, in a stadium or hall, a large number of UE200 s may be located in a certain geographic area and a large number of UE200 s may simultaneously receive the same data. In such a case, the use of MBS rather than unicast is effective.

Unicast may be interpreted as communication performed one-to-one with the network by specifying a specific UE200 (UE200 specific identification information may be specified).

Multicast may be interpreted as communication performed one-to-many (many specified) with the network by specifying a specific plurality of UE200 (multicast identification information may be specified). As a result, the number of UE200 that receive the received multicast data may be 1.

The broadcast may be interpreted as a communication between all UE200 and the network in an unspecified number. The multicast/broadcast data may have the same copied content, but some content, such as headers, may be different. The multicast/broadcast data may also be transmitted (distributed) simultaneously, but does not necessarily require strict concurrency and may include propagation delays and/or processing delays within the RAN node.

The target UE200 may be in an idle state (RRC idle), a connected state (RRC connected), or any other state (For example, the inactive state) in the radio resource control layer (RRC). The inactive state may be interpreted as a state in which some configurations of the RRC are maintained.

MBS assumes the following three methods for scheduling multicast/broadcast PDSCH (Physical Downlink Shared Channel), specifically scheduling MBS packets (which may be read as data). RRC connected UE may be read as RRC idle UE or RRC inactive UE.

PTM transmission method 1 (PTM-1): Schedule group-common PDSCH using group-common PDCCH (Physical Downlink Control Channel) for the MBS group of the RRC connected UE.

Scramble the CRC and PDSCH of the PDCCH using group-common RNTI (Radio Network Temporary Identifier, may be referred to as G-RNTI).

PTM Transmission Method 2 (PTM-2): Schedule a group-common PDSCH using a terminal-specific PDCCH for the MBS group of the RRC connected UE.

The CRC of the PDCCH is scrambled by the UE-specific RNTI.

The PDSCH is scrambled by the group-common RNTI.

PTP transmission method: Schedule UE-specific PDSCH using UE-specific PDCCH for RRC connected UE.

Scramble CRC of PDCCH and PDSCH by UE-specific RNTI. In other words, it may mean that MBS packets are transmitted by unicast.

Figure 3:
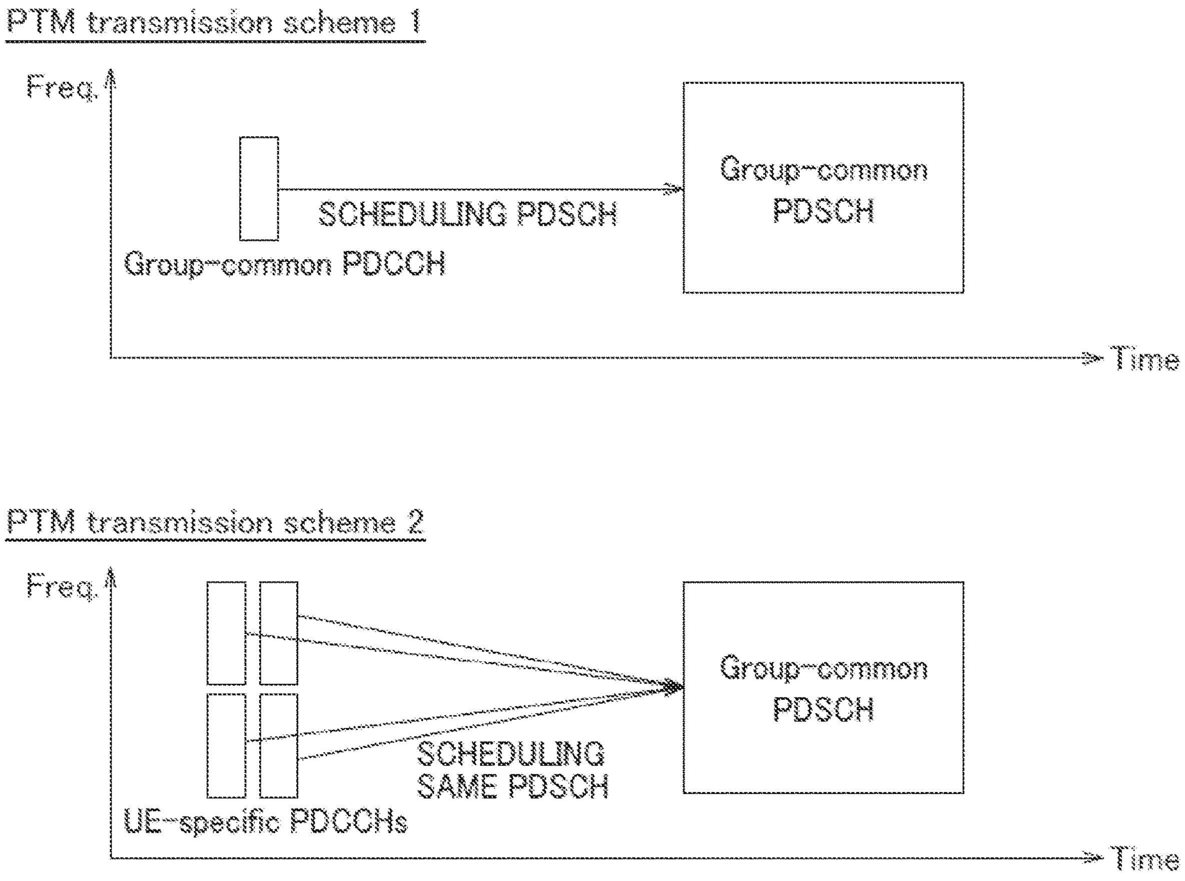
FIG. 3 is a diagram showing a configuration example of the PTM transmission system 1 and the PTM transmission system 2.

FIG. 3 shows a configuration example of PTM transmission method 1 and PTM transmission method 2. The UE-specific PDCCH/PDSCH may be identified by the target UE, but may not be identified by other UEs in the same MBS group. The group-common PDCCH/PDSCH is transmitted at the same time/frequency resource and can be identified by all UEs in the same MBS group. The names of the PTM transmission methods 1 and 2 are tentative and may be called by different names as long as the operations described above are performed.

In point-to-point (PTP) distribution, the RAN node may wirelessly distribute individual copies of the MBS data packets to individual UEs. In point-to-multipoint (PTM) distribution, the RAN node may wirelessly distribute a single copy of the MBS data packets to a set of UEs.

In order to improve the reliability of MBS, the following two feedback methods are envisaged for HARQ (Hybrid Automatic repeat request) feedback, specifically HARQ feedback for multicast/broadcast PDSCH.

Option 1: Feedback of Both ACK and NACK (ACK/NACK Feedback).

- A UE that has successfully received or decrypted a PDSCH transmits an ACK
- A UE that has failed to receive or decrypt a PDSCH transmits a NACK
- PUCCH (Physical Uplink Control Channel) resource configurations: PUCCH-Config can be configured for multicast
- PUCCH resources: Shared/orthogonal between UEs depends on the network configuration
- HARQ-ACK CB (codebook): supports type-1 and type-2 (CB decision algorithm specified in 3GPP TS 38.213)
- Multiplexing: can apply unicast or multicast Option 2: NACK-Only Feedback

- A UE that successfully receives or decrypts PDSCH does not transmit an ACK (does not transmit a response).
- A UE that fails to receive or decrypt PDSCH transmits a NACK
- For a given UE, PUCCH resource configurations can be configured separately by unicast or group cast (multicast)

Note that ACK may be called positive acknowledgement and NACK may be called negative acknowledgement. HARQ may be called automatic retransmission request.

Either of the following may apply to enable/disable Option 1 or Option 2:

- RRC and Downlink Control Information (DCI)
- RRC only

In addition, the following is expected for semi-persistent scheduling (SPS) for multicast/broadcast PDSCH:

- SPS group-common PDSCH (may be called group common SPS PDSCH)
- Multiple SPS group-common PDSCH can be configured for UE capability.
- HARQ feedback for SPS group-common PDSCH is possible
- At least activation/deactivation via group-common PDCCH (downlink control channel) is possible Note that deactivation may be replaced with other synonymous terms such as release. For example, activation may be replaced with start, initiation, trigger, etc., and deactivation may be replaced with end, stop, etc.

SPS is scheduling used as a contrast to dynamic scheduling and may be referred to as semi-fixed, semi-persistent, semi-continuous, etc., and may be interpreted as Configured Scheduling (CS).

Scheduling may be interpreted as the process of allocating resources to transmit data. Dynamic scheduling may be interpreted as the mechanism by which all PDSCH are scheduled by DCI (For example, DCI 1_0, DCI 1_1, or DCI 1_2). SPS may be interpreted as the mechanism by which PDSCH transmissions are scheduled by higher layer signaling, such as RRC messages.

Multicast SPS PDSCH reception may mean group common SPS PDSCH reception, may be SPS PDSCH received by multiple terminals, or may be SPS PDSCH reception associated with G-RNTI or G-CS-RNTI (That is, RNTI associated with multiple terminals). Multicast may also be read as Broadcast.

For the physical layer, there may be time domain scheduling and frequency domain scheduling categories.

Also, multicast, group cast, broadcast, and MBS may be interchanged. Multicast PDSCH and PDSCH scrambled by group common RNTI may be interchanged.

Further, data and packet terms may be interchanged and may be interpreted as synonymous with terms such as signal, data unit, etc. and transmission, reception, transmission and delivery may be interchanged.

(2) Function Block Configuration of Radio Communication System

Next, the function block configuration of the radio communication system 10 will be described. Specifically, the function block configuration of the gNB100 and the UE200 will be described.

Figure 4:
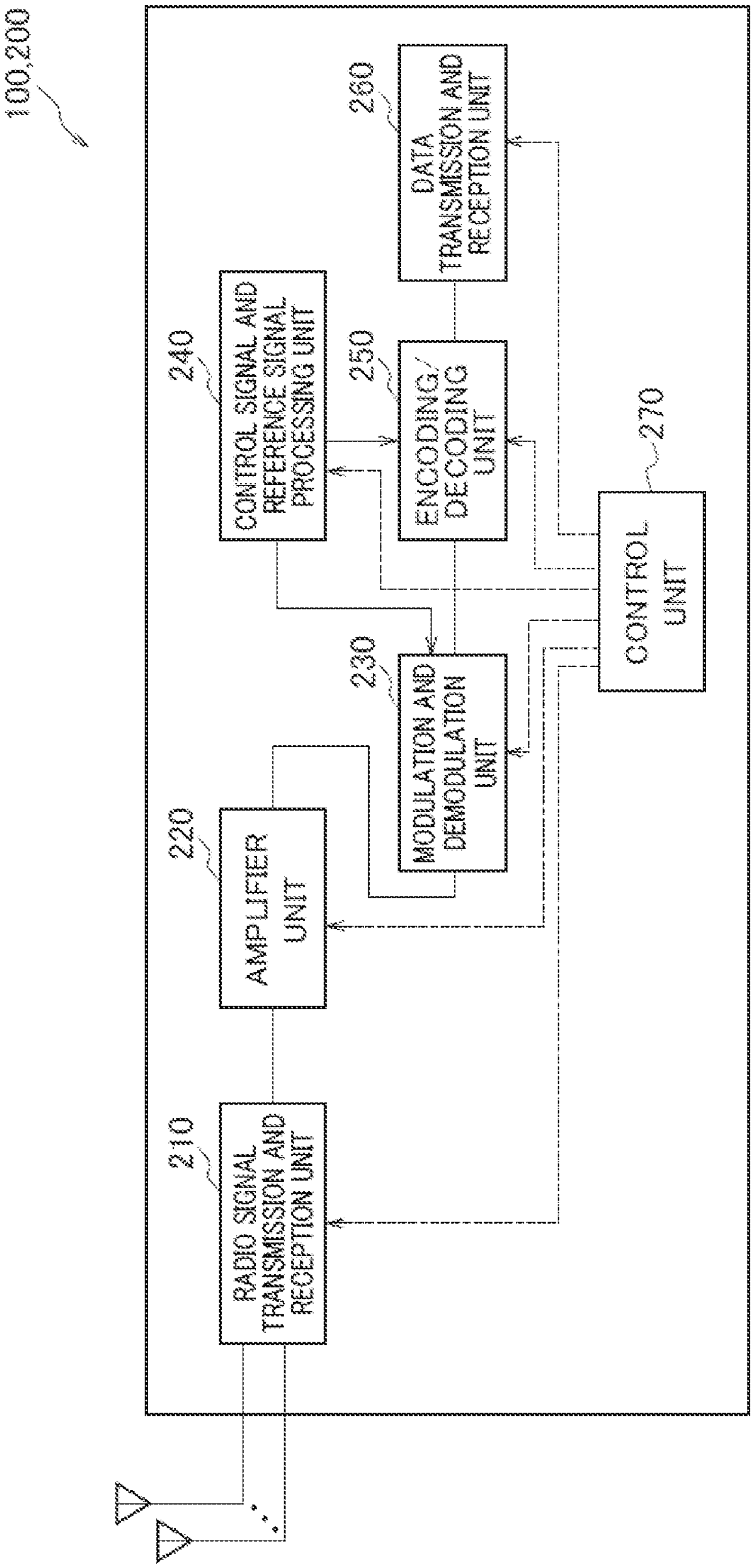
FIG. 4 is a functional block diagram of the gNB100 and the UE200.

FIG. 4 is a function block configuration diagram of the gNB100 and the UE200. The UE200 will be described below. As shown in FIG. 4, the UE200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

Note that in FIG. 4, only the main functional blocks related to the description of the embodiment are shown, and the UE200 includes other functional blocks (For example, the power supply unit). FIG. 4 also shows the functional block configuration of the UE200 (gNB100), and refer to FIG. 17 for the hardware configuration.

The radio signal transmission and reception unit 210 transmits and receives radio signals in accordance with the NR. The radio signal transmission and reception unit 210 corresponds to a Massive MIMO, a CA using a plurality of CCs bundled together, and a DC that simultaneously communicates between a UE and each of two NG-RAN Nodes.

The radio signal transmission and reception unit 210 corresponds to an MBS, and can receive a downlink channel common to a group of terminals in data distribution for a plurality of UE200.

The radio signal transmission and reception unit 210 can receive an MBS, that is, a downlink data channel (PDSCH) in data distribution for a plurality of terminals.

Specifically, the radio signal transmission and reception unit 210 can receive a group-common PDSCH (which may include an SPS group-common PDSCH) that is a downlink data channel (PDSCH) common to a group of terminals.

The radio signal transmission and reception unit 210 can also receive a common downlink control channel for the terminal group, specifically a group-common PDCCH, and can receive a terminal-specific downlink control channel, specifically a UE-specific PDCCH.

The amplifier unit 220 is configured by a PA (Power Amplifier)/LNA (Low Noise Amplifier) or the like. The amplifier unit 220 amplifies the signal output from the modulation and demodulation unit 230 to a predetermined power level. The amplifier unit 220 also amplifies the RF signal output from the radio signal transmission and reception unit 210.

The modulation and demodulation unit 230 performs data modulation/demodulation, transmission power setting, resource block allocation, etc. for each predetermined communication destination (e.g., gNB 100). Cyclic Prefix-Orthogonal Frequency Division Multiplexing (CP-OFDM)/Discrete Fourier Transform-Spread (DFT-S-OFDM) may be applied to the modulation and demodulation unit 230. DFT-S-OFDM may be used not only for the uplink (UL) but also for the downlink (DL).

The control signal and reference signal processing unit 240 executes processing related to various control signals transmitted and received by the UE200 and various reference signals transmitted and received by the UE200.

Specifically, the control signal and reference signal processing unit 240 receives various control signals transmitted from the gNB100 via a predetermined control channel, for example, control signals (messages) of the radio resource control layer (RRC). The control signal and reference signal processing unit 240 also transmits various control signals to the gNB100 via a predetermined control channel.

The control signal and reference signal processing unit 240 executes processing using a reference signal (RS) such as a demodulation reference signal (DMRS) and a phase tracking reference signal (PTRS).

The DMRS is a known reference signal (pilot signal) between a base station and a terminal of each terminal for estimating a fading channel used for data demodulation. The PTRS is a reference signal of each terminal for estimating phase noise, which is a problem in a high frequency band. In addition to the DMRS and PTRS, the reference signal may include a Channel State Information-Reference Signal (CSI-RS), a Sounding Reference Signal (SRS), and a Positioning Reference Signal (PRS) for position information.

The channel may include a control channel and a data channel. The control channel may include PDCCH, PUCCH (Physical Uplink Control Channel), RACH (Random Access Channel, Downlink Control Information (DCI) with Random Access Radio Network Temporary Identifier (RA-RNTI)), and Physical Broadcast Channel (PBCH).

The data channel may also include PDSCH, and PUSCH (Physical Uplink Shared Channel). Data may mean data transmitted over the data channel.

In this embodiment, the control signal and reference signal processing unit 240 may comprise a reception unit that receives downlink control information (DCI). In addition, the control signal and reference signal processing unit 240 may receive a message in the RRC indicating that the function indicated by the DCI is enabled or disabled to enable or disable HARQ feedback.

The encoding/decoding unit 250 performs data partitioning/concatenation and channel coding/decoding for each predetermined communication destination (gNB100 or other gNB).

Specifically, the encoding/decoding unit 250 divides the data output from the data transmission and reception unit 260 into predetermined sizes and performs channel coding for the divided data. The encoding/decoding unit 250 decodes the data output from the modulation and demodulation unit 230 and concatenates the decoded data.

The data transmission and reception unit 260 transmits and receives the protocol data unit (PDU) and the service data unit (SDU). Specifically, the data transmission and reception unit 260 performs assembly/disassembly of the PDU/SDU in a plurality of layers (Media access control layer (MAC), radio link control layer (RLC), packet data convergence protocol layer (PDCP), etc.).

The data transmission and reception unit 260 also performs data error correction and retransmission control based on the hybrid automatic repeat request (ARQ). Specifically, the data transmission and reception unit 260 can transmit HARQ feedback. In this embodiment, the data transmission and reception unit 260 may constitute a transmission unit.

The feedback of the HARQ may include an ACK (affirmative response) and a NACK (negative response) as described above, and a method in which only the NACK is fed back and no ACK is fed back (NACK-only feedback) may be applied.

The control unit 270 controls each functional block that constitutes the UE200. In particular, in the present embodiment, the control unit 270 performs control on the scheduling of the downlink channel with respect to the MBS and the HARQ feedback of the channel.

The control unit 270 performs control corresponding to the scheduling of the downlink data channel common to the terminal group (group common) in the data distribution for the MBS, that is, the plurality of UE 200*s*.

Specifically, the control unit 270 can perform control corresponding to the scheduling of the group-common PDCCH and the group-common PDSCH.

The control unit 270 may assume that SPS of the downlink data channel (PDSCH) for the group of terminals, i.e., semi-fixed scheduling activation/deactivation, is applied for the SPS group-common PDSCH, on a per-terminal group basis.

In addition, the control unit 270 may apply NACK-only feedback, that is, when only NACK of HARQ is fed back, only one cyclic shift (CS) index may be applied to one resource of PUCCH (uplink control channel).

The application of such cyclic shift index may be limited to the case where a bit string of HARQ feedback (which may be called a codebook) is associated with a resource of PUCCH (called Scheme A). Alternatively, it may be expressed as the case where NACK-only feedback is performed using PUCCH format (PF) 0 in Scheme A. Note that the bit string of HARQ feedback may be a bit string including ACK and may be replaced with a bit string corresponding to PDSCH reception.

PF0 is called a short format, and the number of symbols may be 1 or 2. In addition, the application of the cyclic shift index may be applied to either the case of transmitting a 1-bit feedback or the case of transmitting a plurality of bits in multiplex.

Further, as described above, the control unit 270 may apply binary phase shift keying (BPSK) to one resource of the PUCCH when the bit string of the feedback is associated with the resource of the PUCCH and only the NACK is fed back. In this case, only the BPSK may be used, and other phase shift modulations, specifically, quadrature phase shift keying (QPSK) may not be used.

Alternatively, the control unit 270 may assume that the feedback bit string is associated with the PUCCH resource, as described above, and that the index of the PUCCH resource indicates the correspondence between the HARQ feedback bit string and the PUCCH resource when only the NACK is fed back.

Specifically, the control unit 270 may assume that the PUCCH resource index value is associated with a specific table, in which the HARQ-ACK bit example is associated with the PUCCH resource. A configuration example of the table will be described later.

The control unit 270 may also assume that there is only one set of PUCCH resources when the HARQ feedback bit strings are banded and feedback only NACK. When the HARQ feedback bit strings are banded, they may be referred to as Scheme C for convenience. In Scheme C, the HARQ feedback bit strings may be banded (bundled) and aggregated into one bit. Specifically, in Scheme C, if there is at least one NACK in one or more HARQ feedback bit strings, one bit that is a NACK may be transmitted. Note that Scheme B may mean the HARQ feedback without any processing such as multiplexing (Schemes A-C will be described later).

In addition, when the control unit 270 multiplexes multiple bits in NACK-only feedback using a specific PUCCH format, multiple cyclic shift indices may be applied to one PUCCH resource.

Specifically, the control unit 270 may use multiple cyclic shift indices per PUCCH resource when multiplexing multiple bits in NACK-only feedback using PUCCH format 0 (PF0).

For example, a plurality of cyclic shift indices may be associated with a particular PUCCH resource, and which cyclic shift index to use may be determined by the success or failure of PDSCH decoding. Alternatively, a portion of the plurality of bits may be represented by the selection of the cyclic shift index, and the remainder may be represented by the PUCCH resource. A specific example of such an operation will be described later.

In addition, the gNB100 can perform the above-mentioned downlink channel scheduling and HARQ control.

(3) Operation of Radio Communication System

Next, the operation of the radio communication system 10 will be described. Specifically, the operation related to the scheduling of the downlink channel and the HARQ feedback of the channel related to the MBS will be described.

Figure 5:
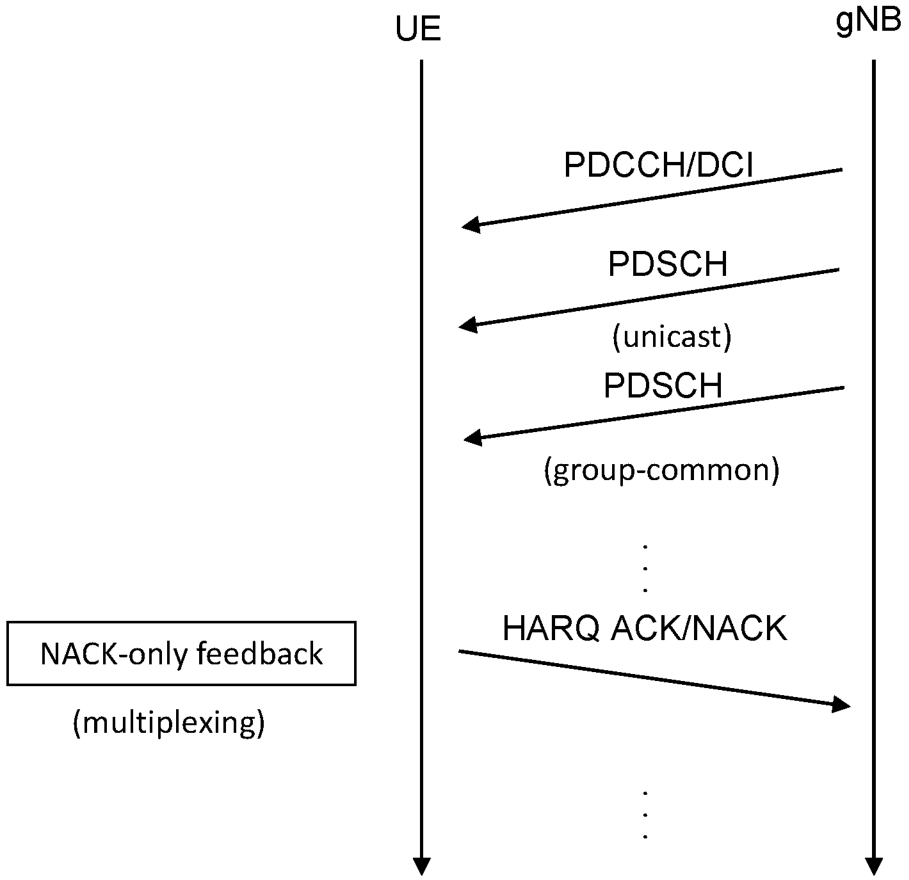
FIG. 5 is a diagram showing an example sequence of PDCCH, PDSCH and HARQ feedback in MBS.

FIG. 5 shows an example sequence of PDCCH, PDSCH and HARQ feedback in MBS. As shown in [FIG. 5] PDCCH (which may include DCI) and PDSCH may be transmitted by unicast or multicast (broadcast). The UE200 may also transmit HARQ feedback (ACK/NACK) for the channel (transport block (TB) received via).

In FIG. 5, it appears that after one PDCCH/DCI, both unicast PDSCH and multicast PDSCH are transmitted, but after one PDCCH/DCI, either unicast PDSCH or multicast PDSCH may be transmitted. That is, one PDCCH/DCI may schedule either unicast PDSCH or multicast PDSCH.

As shown in FIG. 5, in the feedback of HARQ, NACK-only feedback may be applied as described above, and the feedback information (which may be a bit string) may be multiplexed in the NACK-only feedback.

In the case of MBS, if the function of NACK-only feedback is applied as it is, there is a problem that the gNB100 cannot recognize the number of bits pertaining to NACK-only feedback, and blind decoding is required.

Therefore, the following multiplex method may be assumed for NACK-only feedback.

(Scheme A): The value of the HARQ-ACK codebook (bit string) is associated with the PUCCH resource.

(Scheme B): Do not multiplex.

(Scheme C): Apply band ring to make 1 bit.

Figure 6:
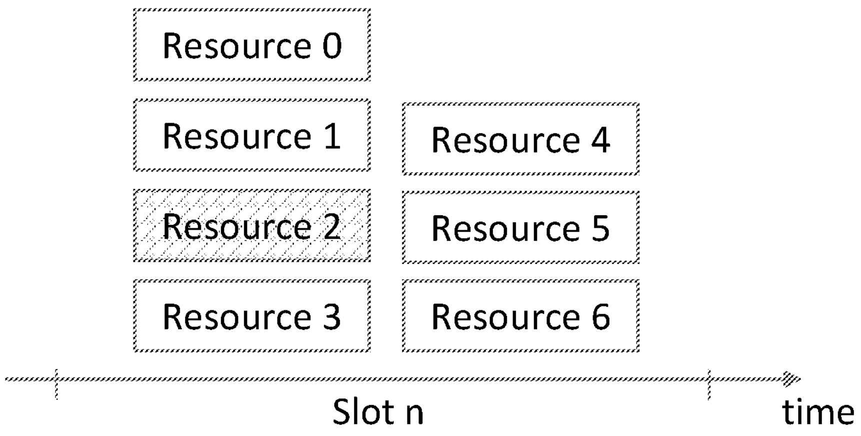
FIG. 6 is a diagram showing an example of determination of a PUCCH resource according to Scheme A.

Note that the multiplexing method need not be limited to Schemes A-C. FIG. 6 shows an example of determining PUCCH resources according to Scheme A. As shown in FIG. 6, the value of the HARQ codebook (bit string) is associated with the PUCCH resource (which may be a combination of the time direction and the frequency direction).

For example, if the feedback of HARQ for three PDSCH reception is NACK, -, NACK (010), Resource 2 is used. In Scheme C, as described above, if there is a NACK, the feedback may be transmitted. Note that '-' may mean that the corresponding PDSCH has been successfully decoded.

Figure 7:
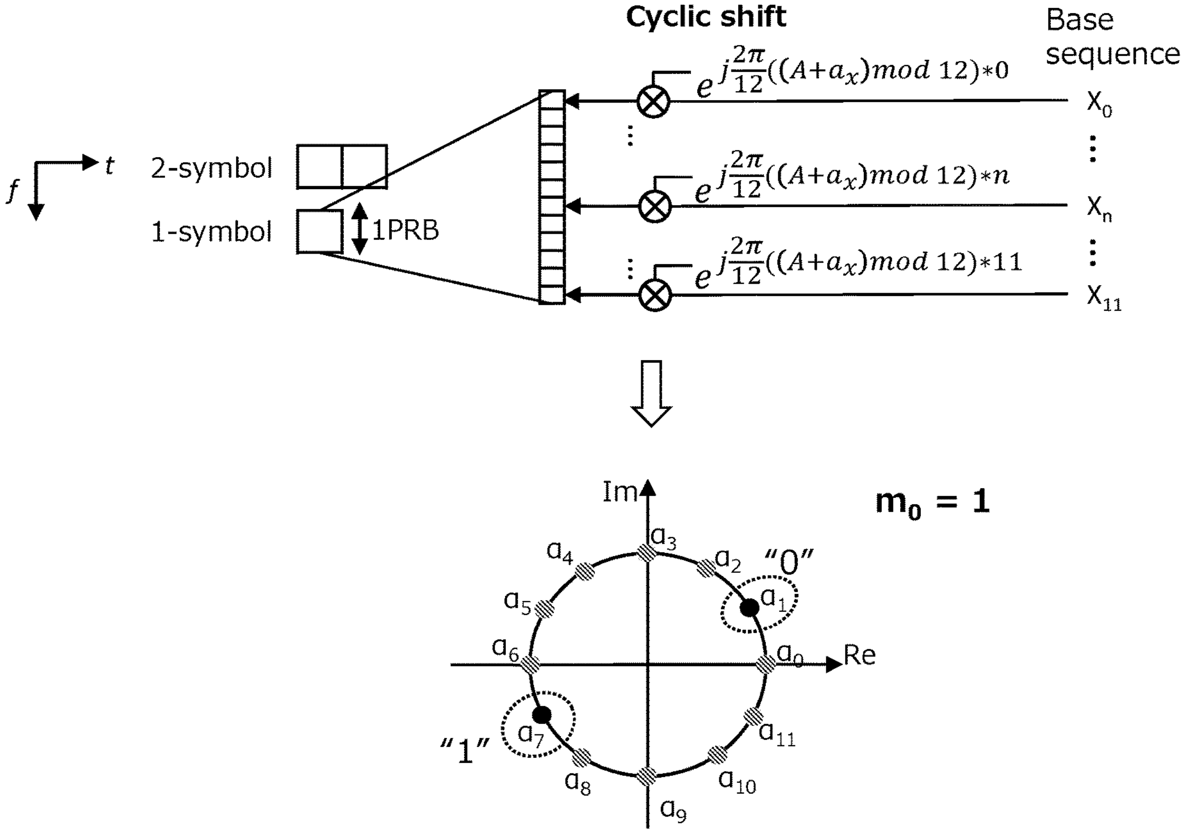
FIG. 7 is a diagram showing an example of transmission of sequence-based uplink control information (UCI) applicable to PUCCH format 0 (PF0).

FIG. 7 shows an example of transmitting sequence-based uplink control information (UCI) applicable to PUCCH format 0 (PF0). As shown in FIG. 7, cyclic shifts are applied to the base sequence ($X_0, \ldots X_n, \ldots, X_{11}$). The initial cyclic shift $m_0$ may be set by RRC. In FIG. 7, an example of $m_0=1$ is shown. Note that A in FIG. 7 may include $m_0$. FIG. 7 shows the ACK/NACK feedback, and the cyclic shift is determined based on the decoding result of the corresponding PDSCH.

Figure 8:
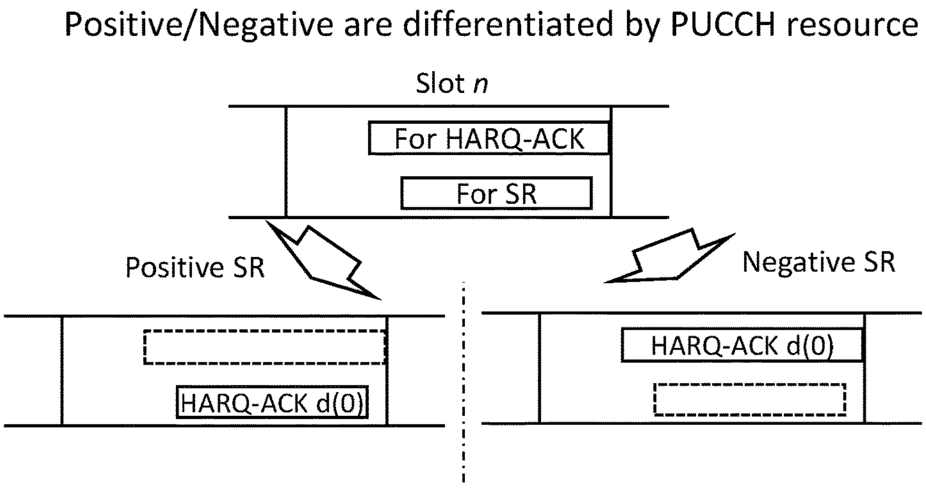
FIG. 8 is a diagram showing an example of allocation of HARQ-ACK and scheduling request (Positive SR, Negative SR).

FIG. 8 shows an example of the assignment of the HARQ-ACK and the scheduling request (Positive SR, Negative SR). As shown in FIG. 8, the UCI may include the scheduling request (Positive SR, Negative SR) in addition to the HARQ feedback, and the PUCCH resources used may vary depending on whether they are positive or negative.

(3.1) Example 1

In this example, in Scheme A described above, when performing NACK-only feedback using PUCCH format 0 (PF0), when transmitting 1 bit or when multiplexing multiple bits, only one cyclic shift index may be used for each PUCCH resource.

Specifically, the UE200 may operate according to any of the examples 1-1~1-3.

(Example 1-1): Always use m_CS (Meaning mcs, hereinafter the same)=X

The a_X shown in FIG. 7 may be defined by m_0+m_CS. X may be defined by the 3GPP specification, where X=0. It may also be limited to the case where it is not multiplexed with a 1-bit Positive SR.

(Example 1-2): It is assumed that multiplexing with a 1-bit Positive SR is not performed (there is no overlap in at least one of the time domain and the frequency domain).

(Example 1-3): When multiplexing with a 1-bit Positive SR, m_CS=Y is used.

Y may be defined by the 3GPP specification and Y=1. Y may be different (orthogonal) for each user (UE200) and may be preset.

According to this operation example, information of a plurality of bits of NACK-only feedback can be transmitted using PUCCH format 0 (PF0).

(3.2) Example 2

In this operation example, in Scheme A described above, when NACK-only feedback is performed using PUCCH format 1 (PF1), when 1 bit is transmitted, and when multiple bits are multiplexed, only BPSK (the signal point corresponding to NACK) may be used for each PUCCH resource.

In other words, in this operation example, QPSK may not be used. The signal point (see [FIG. 7] may be a signal point on the IQ plane corresponding to the NACK of BPSK, but is not limited to such a signal point. For example, a signal point of π/2-BPSK may be used. The PF1 may be called a long format, and the number of symbols may be 4~14.

Specifically, the UE200 may operate in accordance with Examples 2-1 or 2-2.

(Example 2-1): Assume that no multiplexing is performed with a 1-bit Positive SR.

(Example 2-2): When multiplexing with a 1-bit Positive SR, a NACK is sent by the SR resource.

(Example 2-2a): Acts as ACK/NACK feedback instead of NACK-only feedback.

(Example 2-2b): Different signal points are used for transmitting Positive SR+NACK and for transmitting Positive SR only (In other words, the PDSCH was successfully decrypted).

Figure 9:
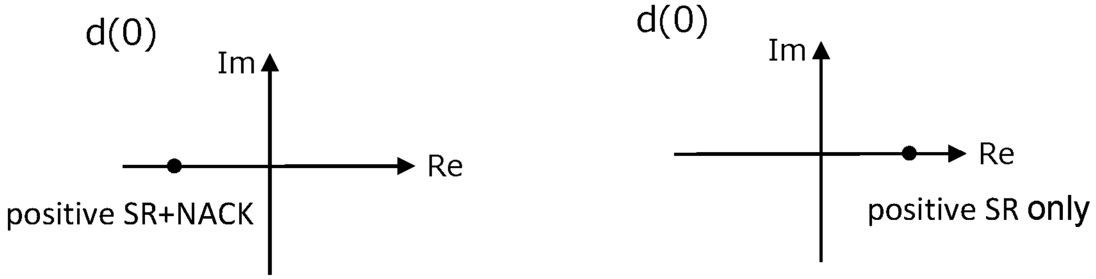
FIG. 9 is a diagram showing an example of a signal point of BPSK according to operation example 2-2b.

FIG. 9 shows an example of a signal point of BPSK according to Example 2-2b. As shown in [FIG. 9] "−1" may be used in the case of Positive SR+NACK, and "+1" may be used in the case of Positive SR only.

According to this operation example, a plurality of bits of NACK-only feedback can be transmitted using PUCCH format 1 (PF1).

(3.3) Example 3

In this operation example, in Scheme A, each PUCCH resource index may be associated with a table/list (multiple resources) to which the HARQ-ACK bit and the PUCCH resource are associated. Note that the HARQ feedback method for each PUCCH resource may be operation examples 1, 2, and 5.

Specifically, the UE200 may operate according to any of operation examples 3-1~3-6.

(operation example 3-1): A PUCCH resource set (That is, a specific PUCCH resource set) is defined as a multiplexable set up to N bits (number of bits including ACK) and the corresponding table contains up to (2^N−1) PUCCH resources FIG. 10 shows an example configuration of a PUCCH resource set and a table associated with the PUCCH resource set according to operation example 3-1.

The PUCCH resource index may be specified, for example, by DCI. FIG. 10 shows an example when N=5. As shown in FIG. 10, when PUCCH resource index=010, Table 2 may be associated. In Table 2, the 5-bit HARQ-ACK bit may be associated with the PUCCH resource (see [FIG. 6].

When N bits can be transmitted and M<N bits are multiplexed, the higher or lower (N-M) bits in the HARQ-ACK bit series corresponding to each PUCCH resource may be "1", i.e., not NACK (corresponding to ACK). For example, when M=4, only the bit series of 1 **** may be used.

(Example 3-2): Multiple PUCCH resource sets are set, and each set has a different N FIG. 11 shows a configuration example (unit 1) of a PUCCH resource set and a table associated with the PUCCH resource set according to operation example 3-2. FIG. 12 shows a configuration example (unit 2) of a PUCCH resource set and a table associated with the PUCCH resource set according to operation example 3-2.

For example, four PUCCH resource sets: set 0, 1, 2, and 3 may be set, each of which can be multiplexed up to a maximum of N0, N1, N2, and N3 bits.

In addition, when transmitting the M bit HARQ-ACK bit (the bit containing the ACK), the set to be used may be determined based on the relationship between M and N0, N1, N2, and N3. For example, it may be determined as follows:

If M<=N0, then set0

If N0<M<=N1, then set1 set2 if N1<M<=N2 set3 if N2<M<=N3

N0, N1, N2, N3 may be different from the values in the case of ACK/NACK feedback and may be set in advance. FIGS. 11 and 12 show an example of N0=2 and N1=5. The PUCCH resource determination method in each PUCCH resource set may be in accordance with operation example 3-1.

(Example 3-3): Only a Single PUCCH Resource Set is Set

For example, operation example 3-1 may be applied regardless of the number of HARQ-ACK bits (bits including ACK).

Figure 13:
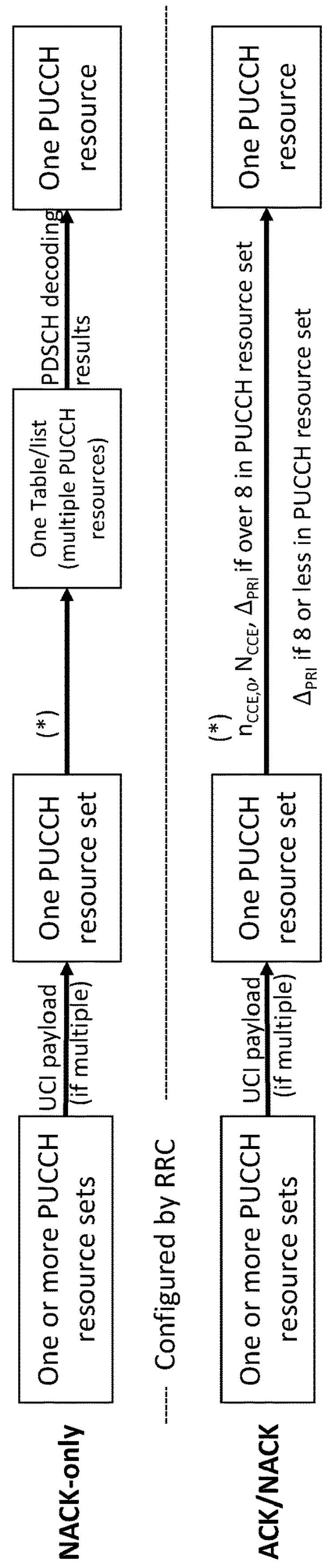
FIG. 13 is a diagram showing an example of determination of NACK-only feedback and PUCCH resource set related to ACK/NACK feedback according to operation example 3-4.

(Example 3-4): The UE200 determines and transmits a PUCCH resource from among the PUCCH resources contained in the table/list specified by the PUCCH resource indicator among the PUCCH resource set to be used, based on the success or failure of PDSCH decoding, or does not transmit HARQ-ACK if all PDSCH have been successfully decoded FIG. 13 shows an example of determination of NACK-only feedback and PUCCH resource set for ACK/NACK feedback in operation example 3-4. Operation example 3-4 may be combined with other operation examples.

Note that the PUCCH resource set in this operation example may be a set for NACK-only feedback and may be the same as the set for ACK/NACK feedback. [FIG. 10]13 may be interpreted as an example in which the set for NACK-only feedback is set separately from the set for ACK/NACK feedback.

(Example 3-5): In the portion where the Downlink Assignment Index (DAI) can recognize that PDCCH/PDSCH has not been received, bits are generated as NACK even in the multiplex of NACK-only feedback.

(Example 3-6): If the number of multiplex bits (May be replaced by the number of bits including the ACK, the number corresponding to the PDSCH reception) exceeds the maximum number of bits in the PUCCH resource set set according to Example 3-1/3-2, the UE200 may operate according to either of the following:

(i): The UE200 does not assume the case (ii): UE200 drops at least some bits For example, bits with low priority or corresponding to PDSCH scheduled forward/backward in time may be dropped, or the maximum number of bits may be dropped.

(iii): UE200 bands at least some bits

For example, bits with low priority or corresponding to PDSCH scheduled forward/backward in time may be banded, or up to a maximum number of bits may be banded.

Figures 14, 15:
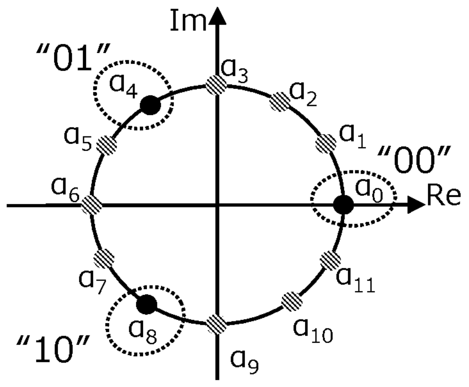
FIG. 14 is a diagram showing an example of a PUCCH resource set according to operation example 3-6.
FIG. 15 is a diagram showing an example of a signal point on an IQ plane according to the operation example 5-1.

FIG. 14 shows an example of a PUCCH resource set according to operation example 3-6. In this operation example, a certain PUCCH resource set may be defined as one table/list as shown in [FIG. 14] and the PUCCH resource may be determined by the HARQ-ACK bit regardless of the PUCCH resource indicator.

According to this operation example, the configuration can be based on the configuration of existing parameters related to the configuration of the PUCCH resource, and signaling can be simplified.

(3.4) Example 4

In this example, only one PUCCH resource set for NACK-only feedback may be set in Scheme C.

Specifically, the UE200 may operate according to any of the examples 4-1~4-4.

(Example 4-1): Only PUCCH format 0 (PF0) or PUCCH format 1 (PF1) is associated.

(Example 4-2): Even if the HARQ-ACK bits for multiple PDCCH/PDSCH reception are banded, the number of HARQ-ACK bits to be transmitted is set to 1 bit and the PUCCH resource set is used (Example 4-3): When the DAI can recognize that PDCCH/PDSCH has not been received, the banding is performed as NACK (i.e., PDCCH/PDSCH decoding has failed).

(Example 4-4): It is not assumed that the HARQ-ACK banding is performed for PDCCH/PDSCH reception exceeding a predetermined number According to this operation example, a plurality of bits of NACK-only feedback can be collectively transmitted, and the configuration of the PUCCH resource can be simplified.

(3.5) Example 5

In this operation example, when multiple bits are multiplexed for NACK-only feedback using PUCCH format 0 (PF0), multiple cyclic shift indices may be used for each PUCCH resource.

Specifically, the UE200 may operate according to operation example 5-1 or 5-2.

(Example 5-1): Multiple cyclic shift indices are associated with a PUCCH resource, and the success or failure of PDSCH decoding determines whether one of the cyclic shift indices is used FIG. 15 shows an example of a signal point on an IQ plane according to operation example 5-1. FIG. 16 shows a configuration example of a PUCCH resource set according to operation example 5-1 and a table associated with the PUCCH resource set.

For example, the cyclic shift index 0, 4, 8 may be associated with PUCCH resource X and the cyclic shift index may be used for the two HARQ-ACK bits (May be replaced by the number of bits including the ACK, the number corresponding to the PDSCH reception) as follows:

HARQ-ACK bits=00: CS index 0
HARQ-ACK bits=01: CS index 4
HARQ-ACK bits=10: CS index 8
HARQ-ACK bits=11: N/A (Example 5-2): Of the multiple bits, some are represented by the selection of the cyclic shift index and the rest are represented by the PUCCH resource For example, in [FIG. 16] the underlined HARQ-ACK bit (2 bits) may be represented by the selection of the cyclic shift index and the remaining 3 bits may be represented by the PUCCH resource.

The operation example 5-2 may be combined with the operation example 3.

(4) Operational Effects

According to the above-described embodiment, the following operation effects can be obtained. Specifically, when the UE200 feeds back only the NACK of the HARQ in Scheme A, only one cyclic shift index can be applied to one resource of the PUCCH (uplink control channel).

Also, when the UE200 feeds back only the NACK of the HARQ in Scheme A, the BPSK (only) can be applied to one resource of the PUCCH.

When the UE200 feeds back only the NACK of the HARQ in Scheme A, the index of the PUCCH resource can be assumed to indicate the correspondence between the bit string of the HARQ feedback and the PUCCH resource.

Also, UE200 can assume that in Scheme C, if it only feeds back ACK, PUCCH has only one set of resources.

Also, UE200 can apply multiple cyclic shift indices to one resource of PUCCH if it multiplies multiple bits in NACK-only feedback using a specific PUCCH format (PF0).

Thus, the network can recognize the NACK-only feedback method of respective UE200 and realize efficient NACK-only feedback in MBS while avoiding blind decoding, etc.

(5) Other Embodiments

Although the embodiments have been described above, they are not limited to the description of the embodiments, and it is obvious to those skilled in the art that various modifications and improvements can be made.

For example, in the embodiments described above, the names PDCCH and PDSCH were used as the downlink channels, but the downlink control channels or downlink data channels (which may be shared channels) may be called by different names.

In the above description, setting (configure), activating (activate), updating (update), indicating (indicate), enabling (enable), specifying (specify), and selecting (select) may be interchanged. Similarly, link, associate, correspond, and map may be interchanged, and allocate, assign, monitor, and map may be interchanged.

In addition, specific, dedicated, UE-specific, and UE-specific may be interchanged. Similarly, common, shared, group-common, UE-common, and UE-shared may be interchanged.

Further, the block configuration diagram ([FIG. 4] used in the description of the above embodiment shows blocks of functional units. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions transmission is called a transmission unit (transmitting unit) or a transmitter. As described above, the method of realization of both is not particularly limited.

Figure 17:
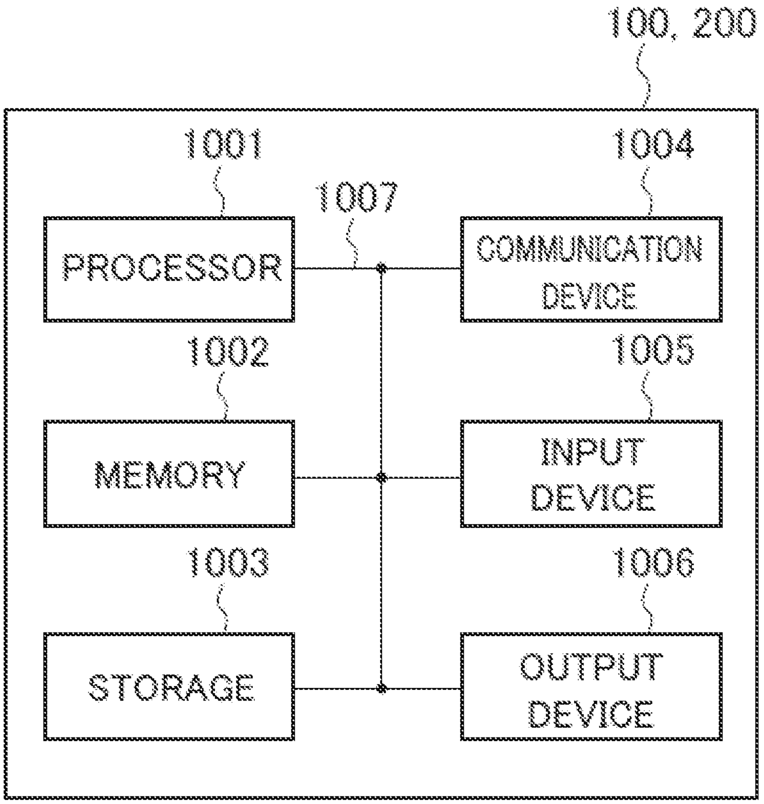
FIG. 17 is a diagram showing an example of a hardware configuration of the gNB100 and the UE200.

In addition, the gNB100 and UE200 described above may function as computers for processing the radio communication method of the present disclosure. FIG. 17 is a diagram showing an example of a hardware configuration of the device. As shown in FIG. 17, the device may be configured as a computer device including a processor 1001, a memory 1002, a storage 1003, a communication device 1004, an input device 1005, an output device 1006 and a bus 1007.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the device (see FIG. 4) is realized by any hardware element of the computer device or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

Processor 1001, for example, operates an operating system to control the entire computer. Processor 1001 may be configured with a central processing unit (CPU), including interfaces to peripheral devices, controls, computing devices, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), or the like. The memory 1002 may store a program (program code), a software module, or the like capable of executing a method according to an embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device, such as the processor 1001 and the memory 1002, is connected by a bus 1007 for communicating information. The bus 1007 may be configured using a single bus or a different bus for each device.

In addition, the device may be configured to include hardware such as a microprocessor, a digital signal processor (DSP), an application specific integrated circuit (ASIC), a programmable logic device (PLD), a field programmable gate array (FPGA), or the like, which may provide some or all of each functional block. For example, the processor 1001 may be implemented by using at least one of these hardware.

Information notification is not limited to the aspects/embodiments described in the present disclosure and may be performed using other methods. For example, notification of information may be performed by physical layer signaling (e.g., Downlink Control Information (DCI), Uplink Control Information (UCI), higher layer signaling (e.g., RRC signaling, Medium Access Control (MAC) signaling, Notification Information (Master Information Block (MIB), System Information Block (SIB)), other signals, or a combination thereof. RRC signaling may also be referred to as RRC messages, e.g., RRC Connection Setup messages, RRC Connection Reconfiguration messages, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing steps, sequences, flowcharts, etc., of each of the embodiments/embodiments described in the present disclosure may be reordered as long as there is no conflict. For example, the method described in the present disclosure presents the elements of the various steps using an exemplary sequence and is not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from a higher layer (or lower layer) to a lower layer (or higher layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the embodiments/embodiments described in the present disclosure may be used alone, in combination, or alternatively with execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channels and symbols may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)," "user terminal," "user equipment (User Equipment: UE)," "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile may be a vehicle (For example, cars, planes, etc.), an unmanned mobile (For example, drones, self-driving cars,), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal, hereinafter the same). For example, each aspect/embodiment of the present disclosure may be applied to a configuration in which communication between a base station and a mobile station is replaced by communication between a plurality of mobile stations (For example, it may be called device-to-device (D2D), vehicle-to-everything (V2X), etc.). In this case, the mobile station may have the function of the base station. Further, words such as "up" and "down" may be replaced with words corresponding to communication between terminals (For example, "side"). For example, up channels, down channels, etc. may be replaced with side channels (or side links).

Similarly, mobile stations in the present disclosure may be replaced with base stations. In this case, the base station may have the function of the mobile station. A radio frame may be composed of one or more frames in the time domain. Each frame or frames in the time domain may be referred to as a subframe. A subframe may be further configured by one or more slots in the time domain. Subframes may be of a fixed time length (For example, 1 ms) independent of numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in time units greater than a minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the subframe and the TTI may be a subframe (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When the TTI is given, the time interval (For example, the number of symbols) in which the transport block lock, code word, etc. are actually mapped may be shorter than the TTI.

When one slot or one minislot is called TTI, one or more TTIs (that is, one or more slots or one or more minislots) may be the minimum scheduling unit. The number of slots (number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB relative to the common reference point of the carrier. PRB may be defined in BWP and numbered within that BWP.

BWP may include UL BWP (UL BWP) and DL BWP (DL BWP). One or a plurality of BWPs may be configured in one carrier for the UE.

At least one of the configured BWPs may be active, and the UE may not expect to transmit and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected," "coupled," or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access." In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to an element using a designation such as "first," "second," and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include," "including," and variants thereof are intended to be inclusive in a manner similar to the term "comprising." Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgment" and "decision" may include regarding some action as "judgment" and "decision." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 radio communication system
20 NG-RAN
100 gNB
200 UE
210 radio signal transmission and reception unit
220 amplifier unit
230 modulation and demodulation unit
240 control signal and reference signal processing unit
250 encoding/decoding unit
260 data transmission and reception unit
270 control unit
1001 processor
1002 memory
1003 storage
1004 communication device
1005 input device
1006 output device
1007 bus

The invention claimed is:

1. A terminal that supports a multicast service, comprising:

a processor that, in a case where a bit string of feedback of an automatic retransmission request for multicast data is associated with resources of an uplink control channel and only a negative response is fed back, applies only an index of one cyclic shift to one of the resources when a first format of the uplink control channel is used, and applies a signal point indicating NACK in two-phase shift modulation to one of the resources when a second format of the uplink control channel is used; and a transmitter that transmits the feedback, wherein the resources are defined as a resource set that is multiplexable up to N bits, where N is a number of bits of the feedback, and a corresponding table contains up to $(2^N-1)$ PUCCH resources and is applied to all the number of bits of the feedback.

2. The terminal according to claim 1, wherein the processor applies only an index of one cyclic shift to one of the resources when the first format of the uplink control channel is used, and applies a signal point indicating NACK in two-phase shift modulation to one of the resources when the second format of the uplink control channel is used, in both cases of the feedback transmitting 1 bit or multiplexing multiple bits.

3. The terminal according to claim 1, wherein the processor performs no multiplexing of the feedback and a positive scheduling request.

4. A base station that supports a multicast service, comprising:

a receiver that receives feedback of an automatic retransmission request for multicast data; and a processor that, in a case where a bit string of the feedback is associated with resources of an uplink control channel and only a negative response is fed back, determines that only an index of one cyclic shift to one of the resources is applied when a first format of the uplink control channel is used, and a signal point indicating NACK in two-phase shift modulation to one of the resources is applied when a second format of the uplink control channel is used, wherein the resources are defined as a resource set that is multiplexable up to N bits, where N is a number of bits of the feedback, and a corresponding table contains up to $(2^N-1)$ PUCCH resources and is applied to all the number of bits of the feedback.

5. A communication system including a terminal and a base station, for supporting a multicast service, wherein the terminal comprises:

a processor that, in a case where a bit string of feedback of an automatic retransmission request for multicast data is associated with resources of an uplink control channel and only a negative response is fed back, applies only an index of one cyclic shift to one of the resources when a first format of the uplink control channel is used, and applies a signal point indicating NACK in two-phase shift modulation to one of the resources when a second format of the uplink control channel is used; and a transmitter that transmits the feedback, wherein the resources are defined as a resource set that is multiplexable up to N bits, where N is a number of bits of the feedback, and a corresponding table contains up to $(2^N-1)$ PUCCH resources, and is applied to all the number of bits of the feedback, and the base station comprises:

a receiver that receives the feedback from the terminal; and a processor that determines that, in a case where only a negative response is fed back, only an index of one cyclic shift to one of the resources is applied when a first format of the uplink control channel is used, and a signal point indicating NACK in two-phase shift modulation to one of the resources is applied when a second format of the uplink control channel is used.

6. A radio communication method of a terminal that supports a multicast service comprising:

in a case where a bit string of the feedback of an automatic retransmission request for multicast data is associated with resources of an uplink control channel and only a negative response is fed back, applying only an index of one cyclic shift to one of the resources when a first format of the uplink control channel is used, and applying a signal point indicating NACK in two-phase shift modulation to one of the resources when a second format of the uplink control channel is used; and transmitting the feedback, wherein the resources are defined as a resource set that is multiplexable up to N bits, where N is a number of bits of the feedback, and a corresponding table contains up to $(2^N-1)$ PUCCH resources and is applied to all the number of bits of the feedback.

* * * * *